US008065846B2

(12) United States Patent
McDonald et al.

(10) Patent No.: US 8,065,846 B2
(45) Date of Patent: Nov. 29, 2011

(54) MODULAR BUILDING PANELS, METHOD OF ASSEMBLY OF BUILDING PANELS AND METHOD OF MAKING BUILDING PANELS

(76) Inventors: Frank McDonald, Orinda, CA (US); Susan Novy McDonald, Orinda, CA (US)

(*) Notice: Subject to any disclaimer, the term of this patent is extended or adjusted under 35 U.S.C. 154(b) by 742 days.

(21) Appl. No.: 10/553,172

(22) PCT Filed: Apr. 19, 2004

(86) PCT No.: PCT/US2004/012046
§ 371 (c)(1),
(2), (4) Date: Aug. 8, 2006

(87) PCT Pub. No.: WO2004/094739
PCT Pub. Date: Nov. 4, 2004

(65) Prior Publication Data
US 2007/0094963 A1      May 3, 2007

Related U.S. Application Data

(60) Provisional application No. 60/463,435, filed on Apr. 17, 2003.

(51) Int. Cl.
*E04B 2/00* (2006.01)
*E04B 2/84* (2006.01)
*E04B 2/06* (2006.01)

(52) U.S. Cl. ..... 52/281; 52/745.19; 52/293.3; 52/586.1; 52/262

(58) Field of Classification Search ............. 52/23, 262, 52/264, 271, 236.6, 745.1, 745.19, 223.7, 52/281, 283, 286, 293.3, 586.1, 309.9; 29/897.3, 29/897.31, 897.312, 897.32, 458, 525.13, 29/525.15
See application file for complete search history.

(56) References Cited

U.S. PATENT DOCUMENTS

| 2,204,319 | A | | 6/1940 | Parsons | |
|---|---|---|---|---|---|
| 2,735,518 | A | | 2/1955 | Schopper | |
| 3,330,084 | A | * | 7/1967 | Russell | 52/300 |
| 3,706,168 | A | * | 12/1972 | Pilish | 52/234 |
| 3,713,257 | A | * | 1/1973 | Beavers | 52/36.6 |
| 3,755,982 | A | * | 9/1973 | Schmidt | 52/295 |
| 3,760,548 | A | | 9/1973 | Sauer | |
| 3,777,435 | A | * | 12/1973 | Perina | 52/586.1 |
| 3,934,382 | A | * | 1/1976 | Gartung | 52/144 |

(Continued)

FOREIGN PATENT DOCUMENTS

GB        2057529        4/1981

OTHER PUBLICATIONS

"New Sandwich Panel System Combines Steel, EPS and Polymerized Cement for Tropical Housing," Automated Building, Aug. 1996, pp. 18-20.

*Primary Examiner* — Dalena Tran
*Assistant Examiner* — Jason Holloway
(74) *Attorney, Agent, or Firm* — Andrew C. Aitken

(57) ABSTRACT

A modular construction system is made of a plurality of panels having peripheral frame elements defining a top channel, a bottom channel, and side channels. An exterior planar sheet and an interior planar sheet element enclose an inner core region that is filled with an adhesive bonding material that attaches the components together.

15 Claims, 19 Drawing Sheets

U.S. PATENT DOCUMENTS

| | | | |
|---|---|---|---|
| 4,023,319 A * | 5/1977 | Kurata | 52/308 |
| 4,028,855 A * | 6/1977 | Prewer | 52/272 |
| 4,035,972 A * | 7/1977 | Timmons | 52/241 |
| 4,360,553 A | 11/1982 | Landheer | |
| 4,567,698 A | 2/1986 | Morrison | |
| 4,726,157 A | 2/1988 | Hult | |
| 4,914,878 A * | 4/1990 | Tamaki et al. | 52/239 |
| 5,136,822 A * | 8/1992 | Blum | 52/241 |
| 5,165,212 A | 11/1992 | Arnold | |
| 5,353,560 A | 10/1994 | Heydon | |
| 5,377,470 A * | 1/1995 | Hebinck | 52/405.1 |
| 5,384,993 A | 1/1995 | Phillips | |
| 5,505,031 A | 4/1996 | Heydon | |
| 5,638,651 A * | 6/1997 | Ford | 52/309.7 |
| 6,131,365 A * | 10/2000 | Crockett | 52/794.1 |
| 6,161,339 A * | 12/2000 | Cornett et al. | 52/23 |
| 6,256,960 B1 * | 7/2001 | Babcock et al. | 52/592.1 |
| 6,485,800 B1 * | 11/2002 | Liittschwager et al. | 428/15 |
| 6,591,556 B2 * | 7/2003 | Bertheaume et al. | 52/74 |
| 7,127,865 B2 * | 10/2006 | Douglas | 52/745.13 |
| 7,762,033 B2 * | 7/2010 | Scott et al. | 52/425 |

* cited by examiner

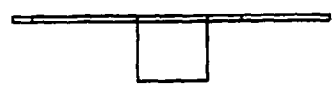
FIG. 16
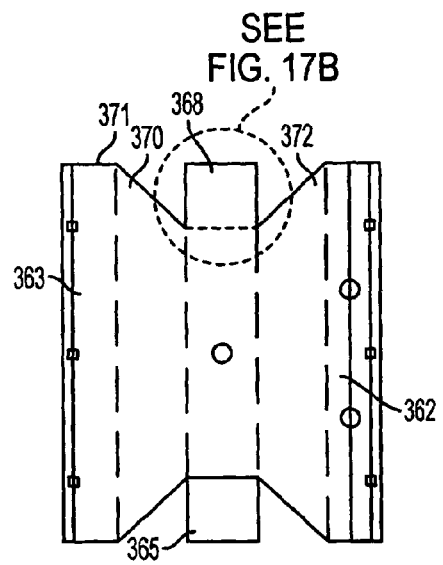
FIG. 17A
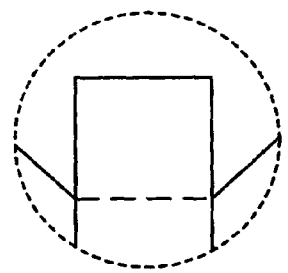
FIG. 17B
FIG. 18
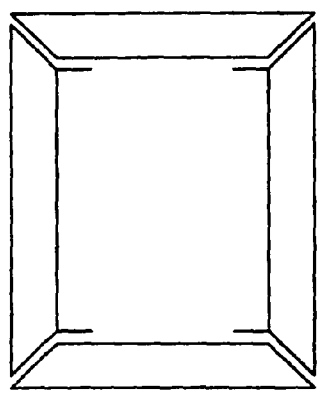
FIG. 19
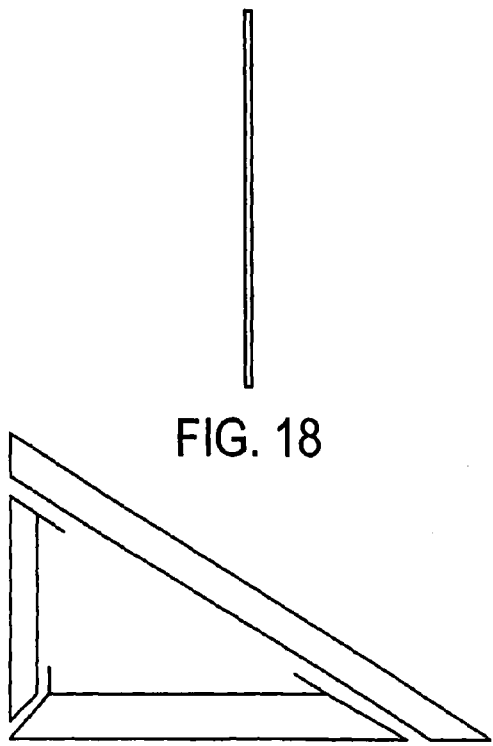
FIG. 20

MODULAR BUILDING PANELS, METHOD OF ASSEMBLY OF BUILDING PANELS AND METHOD OF MAKING BUILDING PANELS

This invention relates to modular building panels used for the construction of structures, a method of manufacturing panels, and a construction system using the panels disclosed herein. The building panels are ideally suitable for use in the construction of single-story conventional residential dwellings or utility buildings such as storage sheds.

BACKGROUND OF THE INVENTION

The costs for building new structures has rapidly increased and builders and developers are constantly searching for manners in which to minimize construction costs to create affordable buildings. As a result, one principal goal of both housing providers and potential housing purchasers is to reduce costs. Major elements that make up the costs of construction include both the materials used for the structure and labor that is involved in the construction process. In connection with the materials, conventional construction techniques typically use relatively expensive materials such as wood and steel. Further, the labor necessary in the construction process requires a relatively skilled labor force that adds to the expense. Conventional construction techniques require that building materials that are used must be worked on site to conform to the building plans. It is generally recognized that if the time in which to construct the structure can be reduced, the labor costs may be commensurately be reduced.

While selecting less expensive materials can reduce the overall construction costs, the resulting structure may be of poor quality and the resulting structure often will not last. Dwellings that are constructed of low cost materials may not be attractive, and as a consequence, are difficult to resell. In some applications—such as the provision of temporary housing—the durability and resale value is not a significant concern. However, when units are used for permanent housing, the durability and ability to resell the structure often influences the choices for materials.

In many circumstances the need or demand for housing can be manifested very quickly. For example, in circumstances after natural disasters, such as hurricanes, tornadoes, forest fires, earthquakes, mud slides and volcanic eruptions, large populations may be displaced and rendered homeless. Political turmoil may also result in the movement of numerous refugees that require housing. Military forces also have acute and rapid requirements for housing on short notice, such as when there is a rapid need to deploy or train troops.

When natural disasters such as tornadoes, floods or hurricanes strike a community, homes often are destroyed and there is an immediate need for housing. In the past, trailer homes have been transported to the natural disaster site to provide refuge for the people left homeless and to provide living and work space for relief workers. Because trailer homes are relatively large, the transportation of the house trailers to the natural disaster site presents problems. Often the trailers are too large for roadways, too heavy for bridges and airlifting trailers is costly. Further, the movement of trailers over long distances is expensive in terms of fuel costs, trucking costs and labor expenses. Because the trailers must be engineered to be transported, costs are further increased. Pre-manufactured housing such as trailers or mobile homes can provide a number of advantages but often the costs involved make this alternative prohibitive or unattractive. Because the structure is pre-manufactured, there is little flexibility for alternative floor designs. Because the structure must be transported, the dimensions that the structure can be built are limited in terms of width, height and length.

Another conventional response to acute housing needs is to provide tents. Tents are relatively inexpensive, can be quickly erected, and are easy to transport. However, tents cannot be secured to the degree of a building that has rigid walls, they are typically not well insulated and therefore are not suitable for cold weather applications. Most tents do not have advantages of glass windows and they are also not particularly durable. It is self evident that tents are limited to single story structures. As a result, tents are generally not considered suitable for long term housing solutions.

In response to the need for alternative structures, there has been considerable development of prefabricated or modular shelter structures. Most of the prefabricated shelter structures that are disclosed in the prior art require special fasteners and hardware in order to produce a shelter with desired rigidity and ruggedness. Often, the use of the special hardware requires additional training and a skilled workforce to assemble the structures on site. If special hardware is lost, the replacement of the parts necessary to assemble the materials may be difficult. Some of the building structures and shelters that have been disclosed in the prior art have panels that are connected by conventional fasteners, such as bolts, spikes, nails, rivets, or pins. Typical of such structures are the buildings shown in U.S. Pat. No. 1,924,414; U.S. Pat. No. 3,512,316; U.S. Pat. No. 3,566,554; U.S. Pat. No. 3,838,545; U.S. Pat. Nos. 3,992,829; 4,637,179; and U.S. Pat. No. 5,285,604. However, in view of the numerous attachment points between building panels, these buildings are difficult and time-consuming to both assemble and disassemble.

U.S. Pat. No. 4,726,155. (the '155 patent) discloses the use of hinged panels connected to one another that avoids some of the problems with connecting adjacent panels. The structure disclosed in the '155 patent can be rapidly assembled on site but still requires significant assembly time at the production facility. U.S. Pat. No. 3,802,134 discloses the use of numerous latch members to interlock adjacent panels thereby simplifying the assembly process on site. Another approach disclosed in the prior art is the use of interlocking tongue-in-groove arrangements to connect adjacent panels.

Sometimes modular elements used to construct a dwelling are separately shipped to the location. However, often the size and weight of the modular components is a significant concern, especially when the transportation requires airlifting or overland truck routes. Some of the pre-engineered components have dimensions that make transportation and subsequent subassembly on the building site difficult. For example, pre-manufactured roof trusses often require a crane or many laborers to position the roof truss on the top of a building.

Efforts to try to reduce and simplify the labor involved with conventional construction techniques have been significant. For example, ceiling trusses and floor joists are sometimes pre-manufactured and delivered to the job site and this technology has served to reduce both material and labor costs. The development of power nail guns has significantly reduced the time spent in connecting the structural parts of a building. Still, conventional stick frame housing cannot be quickly assembled and this building technique generally requires significant skilled carpenter labor, as well as other tradesmen. There is still required significant on site cutting and assembly of raw lumber in connection with conventional construction. Conventional construction techniques also generate significant waste.

The applicant and inventor developed a system to address many of these issues that was disclosed in Automated Builder, August 1996. The present invention is directed to further improvements to the system that was previously disclosed. In this regard, the assembly of the panels described in the applicant's prior art system required significant efforts. The prior art panels are comprised of expanded polystyrene blocks and opposite cementitious skins. Cement was set within the frame—a continuous welded part—to set. The foam blocks were assembled on top of the first layer of cement. Further, the prior art system did not have a solution to construct corners, to attach adjacent panels, or to provide panels for floors.

There is a continuing need for improved, inexpensive, durable, pre-manufactured materials that can be quickly assembled into structures. There also continues to be a need to provide economical building systems which can be rapidly constructed with a minimum of labor skills. Ideally units constructed should be able to be secured, have low maintenance requirements, and be energy efficient. The building system should also accommodate different designs and floor plans that can be catered to the particular application. Ideally, the system should include all of the required structural components including floors, walls, ceilings, trusses, and roof elements. Moreover, the system should be adaptable to accommodate locally available materials that are abundant and make economic sense to substitute for the structural component based upon local conditions. Further, the materials and the building system should be able to be adapted to build different types of buildings. Such a system should be able to be assembled with minimal training or skills and with conventional tools. More particularly, the system should be capable of eliminating the need to use a wide assortment of conventional materials that are expensive and their use involves considerable labor and skill, such as structural graded lumber, steel parts such as I beams and joist hangers, seismic plywood panels, plastic non-biodegradable and adhesive products.

Accordingly it is an object of the present invention is to provide a modular construction system using panels that can be assembled into structures.

A further object of the invention is to provide a method of manufacturing panels that can be assembled into structures.

It is yet a further object of the invention to provide structures with low maintenance requirements, provide for the conservative use of natural resources, and provide flexibility in style and design.

A further object of the invention is to provide a modular building panel that has integrated insulation.

Another object is to provide a total integrated system of structural components that functions as a building system of floors, walls, ceilings and trusses that can replace other materials that are conventionally used in wood frame or masonry buildings.

BRIEF DESCRIPTION OF THE INVENTION

The present invention relates to improvement to modular construction systems and parts, construction techniques using the improved parts and applications for the construction system and methods disclosed. One aspect of the invention is directed to a panel having a frame with a square groove around the periphery of the panel that may be assembled into structures. The frame is preferably made of galvanized steel or other materials having similar properties that are attached to one another using preformed tabs. The tab elements of the frame are attached to adjacent frame elements, preferably using an Adduxtor device. Panels may be rectangular, square or triangular. The manner of attachment of the adjacent frame elements allows the panels to be constructed for gables wherein the top and bottom surfaces are not parallel. A further improvement is directed to a corner panel. Improvements to the panel include the introduction of polyurethane foam that serves as both an adhesive locking the elements of the panel together and an insulator. The frame includes a first planar panel that is comprised of an outside planer sheet forming a first side. The first planer panel is intended to be oriented so that its exposed surface will face the exterior of the structure. A second planar panel that forms the opposite side of the panel is intended to face the interior of the structure. These two sheets enclose and define a core region that is later filled with adhesive polyurethane foam that expands within a press and secures the elements together. In the manufacturing process, the first and second sheets are situated on a press on opposite sides of the frame. Then polyurethane foam is injected into the center region, which expands and pushes the panels out toward the edges of the frame. The press limits the movement of the panel to a predetermined distance. The resulting panel is a laminate structure having a frame around the outer periphery. As discussed in detail below, the frame has a square channel that receives elongate struts on the top and bottom sections. The square channels that abut one another on adjacent panels create vertical passages that receive tie rods that are attached to the top and bottom struts. Additional improvements include the incorporation of a hook and loop fastening system between adjacent panels and new frame arrangements that allow for the construction of multiple story units and an elongate foam sleeve that receives the tie rods that serves as an insulator and retains the rods in place during the assembly process.

The planar sheets that make up the panel may be made of concrete, wood, plastic or fiberboard. In an alternative and preferred embodiment of the invention, the exterior sheets are comprised of concrete or cement that is reinforced with a steel mesh or fiberglass mesh. The concrete is poured into a mold on a vibratory table and allowed to set. The hardened sheet is then placed within a press and the frame is placed on the concrete sheet. In this embodiment, the top panel is comprised of gypsum board that is placed on top of the frame within the press. While the concrete or cement board exterior facing is a preferred embodiment, any combination of materials may be used in creating the panel including but not limited to fiberboard, wood, or plywood. The choice of the panels may depend on local economic or safety factors. For example, if the structure is built in an area that is prone to fire, one may chose fire retardant materials for the panels.

It is possible to make panels of a variety of shapes including polygons such as trapezoidal panels that can be used to construct roof gables. Because the units can be manufactured and then quickly assembled on site, the invention is particularly suited for disaster relief or for providing housing in connection with military deployments. Other applications include medical aid stations, fishing huts, hunting blinds, docks and schools.

BRIEF DESCRIPTION OF THE DRAWINGS

FIG. 16 depicts a side view in elevation of a sheet of metal before it has been shaped into a frame element.

FIG. 17 is a top view in elevation of a sheet of metal that has been cut but not yet shaped to form a frame element.

FIG. 18 is a side view in elevation of a sheet of metal before shaping it to form a frame element.

FIG. 19 is a schematic representation of manners in which to provide tabs to adjacent frame elements.

FIG. 20 is a schematic representation of manners in which to provide tabs to adjacent frame elements.

DETAILED DESCRIPTION OF THE INVENTION

Figure 1:
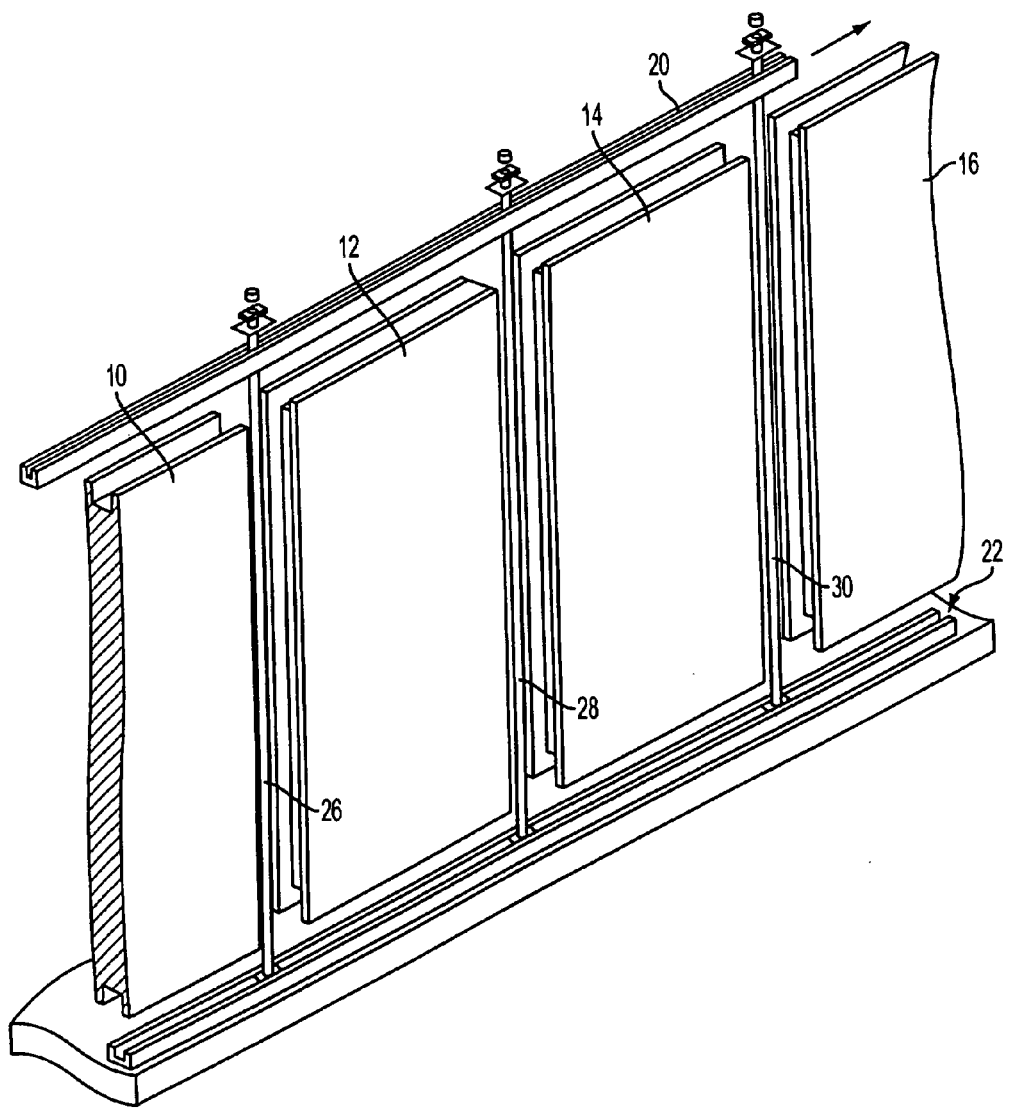
FIG. 1 is an exploded view showing the manner of attachment of a series of panels using a horizontal elongate member and threaded rods.

Now referring to FIG. 1, a series of four panels 10, 12, 14 and 16 that are constructed according to the invention are shown. On the top of the panels, around the periphery of each panel is a metal frame that has a square profiled channel. As seen on panel 12, the panels also include a groove or channel on the lateral sides. Top strut 20 is received in the channel made along the top of each panel. Along the bottom of the panels a bottom strut is received in a bottom channel provided on the panels. The bottom strut, which extends across a plurality of panels, is affixed to the floor. In this embodiment, the floor is comprised of a concrete slab and the bottom strut may be affixed in the slab by suitable anchors. Any base element including a floor, a foundation wall or the top of a wall may be used to support a bottom strut. A typical wall may consist of a plurality of panels. Bottom strut 22 may be installed using a power gun fastening system such as that sold by the Hilti Company, of Tulsa, Okla. Alternatively, holes may be drilled in the concrete and expansion bolts inserted therein or a bolt and adhesive mixture may be interested into the hole. In yet another embodiment, bolts or rods may be set within the concrete that extend upwardly and the bottom strut may be attached to the slab with conventional nuts.

Figure 2:
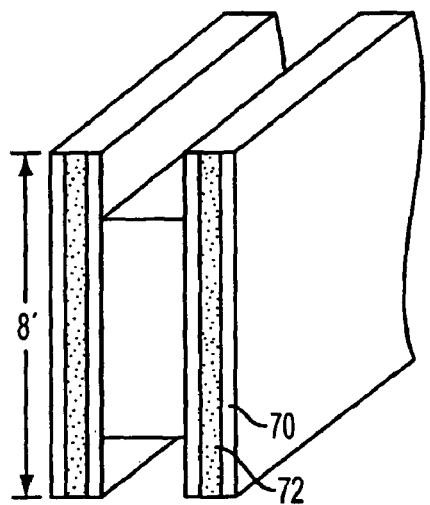
FIG. 2 is perspective view of a panel that schematically depicts a hook and fabric fastening system on the sides of a panel frame.

Also shown in FIG. 1 are a plurality of elongate threaded rods 26, 28 and 30 that connect top strut 20 to bottom strut 22. A first end of rod 26 is received and secured in top strut 20 and the opposite end is received in the bottom strut 22. The rod is received within the vertical channel or slot and that remains between lateral panels when they abut one another. The rods are preferably encased in polyurethane foam that serves to seal the adjacent panels and provide insulation. Now referring to FIG. 2, in a preferred embodiment the abutting surfaces of adjacent panels may be provided with a hook and loop fabric fastening system such as VELCRO. In this alternative embodiment, when it is desirable to increase the sheer properties between panels, a strip fastener 72 is attached to opposite sides of abutting surface 70 of the frame of the panel by adhesive and or other conventional fastening method. When the fastening strip comes into contact with an abutting panel having a complementary loops or hook fastener, the feature may provide up to approximately 6777 lbs of sheer between adjacent panels. The adhesive strip may also serve as a seal between adjacent panels.

In an alternative embodiment, the top and bottom struts may be tied together using wire in tension.

In a preferred embodiment and method of construction, the panels are assembled together using shaped steel elongate strut connector members that are commercially available and sold under the trade name or trademark UNISTRUT. According to a method of construction, a steel strut member having a "U" shaped sectional profile is attached to a floor. Panels are then installed adjacent to one another wherein the channel on the lower surface fits over the bottom strut. When a span of a predetermined number of panels is completed, a second elongate strut connector member is installed in the channel located on the top of the respective panels. Tie rods are then inserted in the vertical spaces formed by the channels on adjacent panels. Upon completion of the tie rod insertion step, the space between adjacent panels may be filled with polyurethane foam or other conventional insulation. In an alternative embodiment, the tie rod is received within an elongate foam sleeve. While a "U shaped" strut is preferred, it is contemplated that other struts may be advantageously used with the invention including tubular struts and solid struts.

While in a preferred embodiment the slot or channel has a rectangular or square profile, it is contemplated that alternative channel and strut arrangements may also be advantageously employed with the invention. For example, it is contemplated that the grooves have a "V shaped" triangular profile, a ½ hexagonal profile or be rounded. However, when shapes are selected that do not have a flat channel, the assembly of the frame elements may become more complex.

Figure 3:
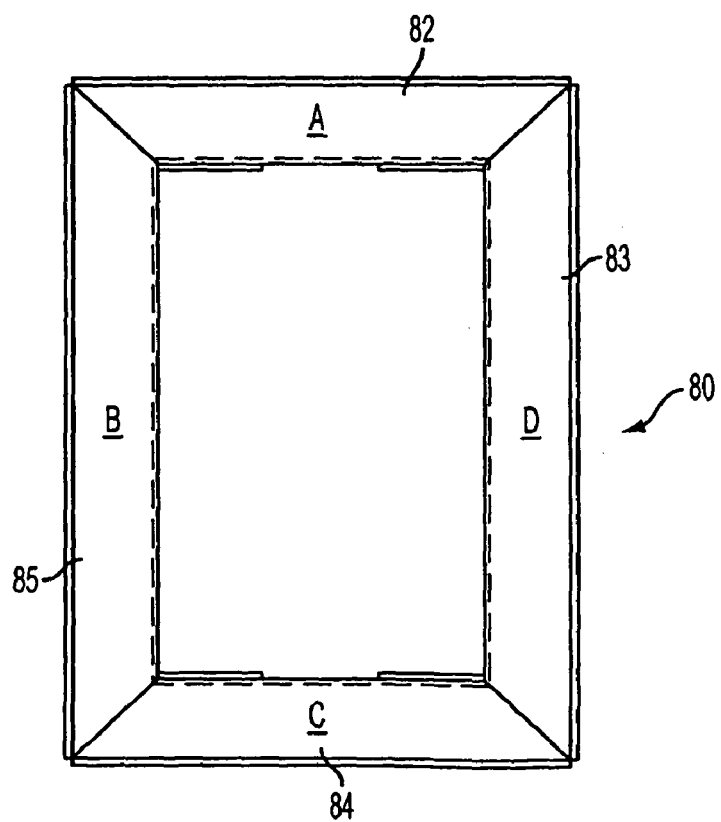
FIG. 3 is a plan isometric view of a frame that is used to make the panels.
Figure 27:
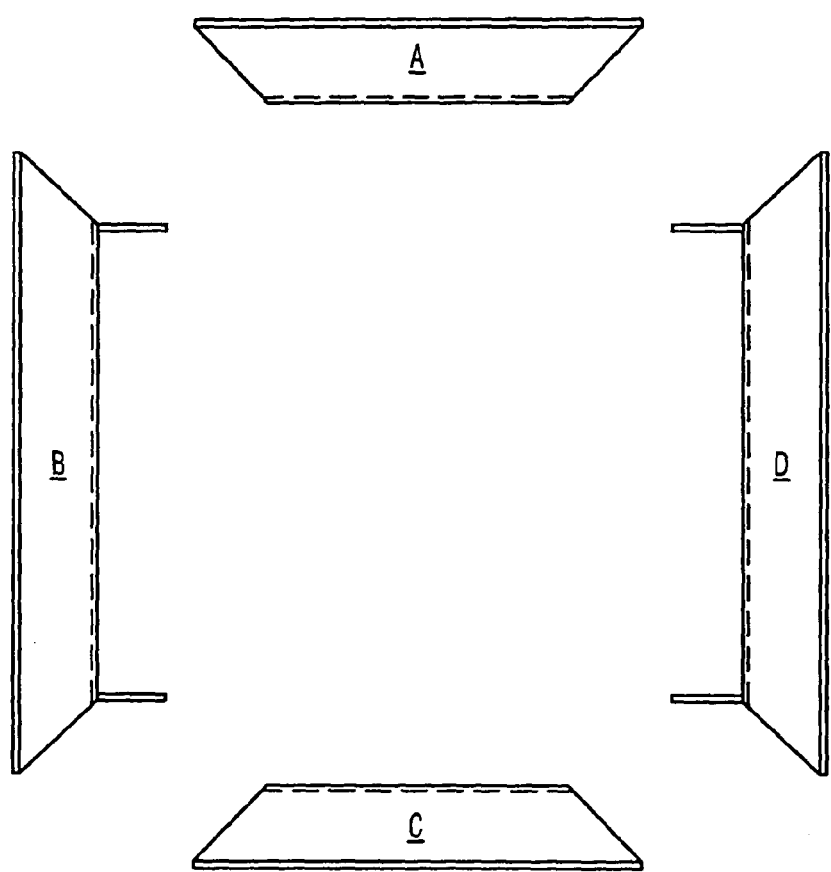
FIG. 27 is an exploded side view of four frame elements depicting the tabs on the lateral frame members.

Now referring to FIG. 3, a frame 80 is illustrated that is comprised of four frame elements: top element 82, lateral element 83, lateral element 85 and bottom element 84. In a preferred embodiment, sixteen-gauge steel is bent on a suitable mandrel to form the frame elements having square profiled channels. As best seen in FIG. 27, the frame elements are then joined together wherein an overlap or tongue is bent to receive an adjacent rail. In a preferred embodiment the system uses an Attxor system to mechanically clip the parts together. Other fastening techniques may be employed as well, such as conventional rivets, welding or an appropriate adhesive. Clinching and stitch folding are alternative methods for joining sheet material without rivets, screws or other added fasteners. Both clinching and stitch folding equipment is generally driven by compressed air. The stitch folding technique literally stitches material together, similar to stapling paper. However, in contrast to stapling, the stitch folding method generates its own staples from the base material. Clinching generates a rivet-like joint from the sheets to be assembled through plastic cold flow in a punching and squeezing sequence. Clinching works with pre-coated or galvanized material as well as with steel and aluminum combinations and the final assembled product does not require further finishing work. Clinching is advantageous because it does not build any thermal stresses into the assembled product thus resulting in joints that have exceptionally good performance in situations of thermal fatigue or fire. Because the joint is created from the base metal itself without any additional parts or alien material, the technique also has favorable corrosion properties and the base metal can easily be recycled. Systems for clinching and stitch folding are available from Attexor Corp. that has locations in Massachusetts and Switzerland. The dimensions of the panels may be of a variety of lengths and heights. In a preferred embodiment, wall panels are built in two foot width sections and are eight feet tall.

Figure 4:
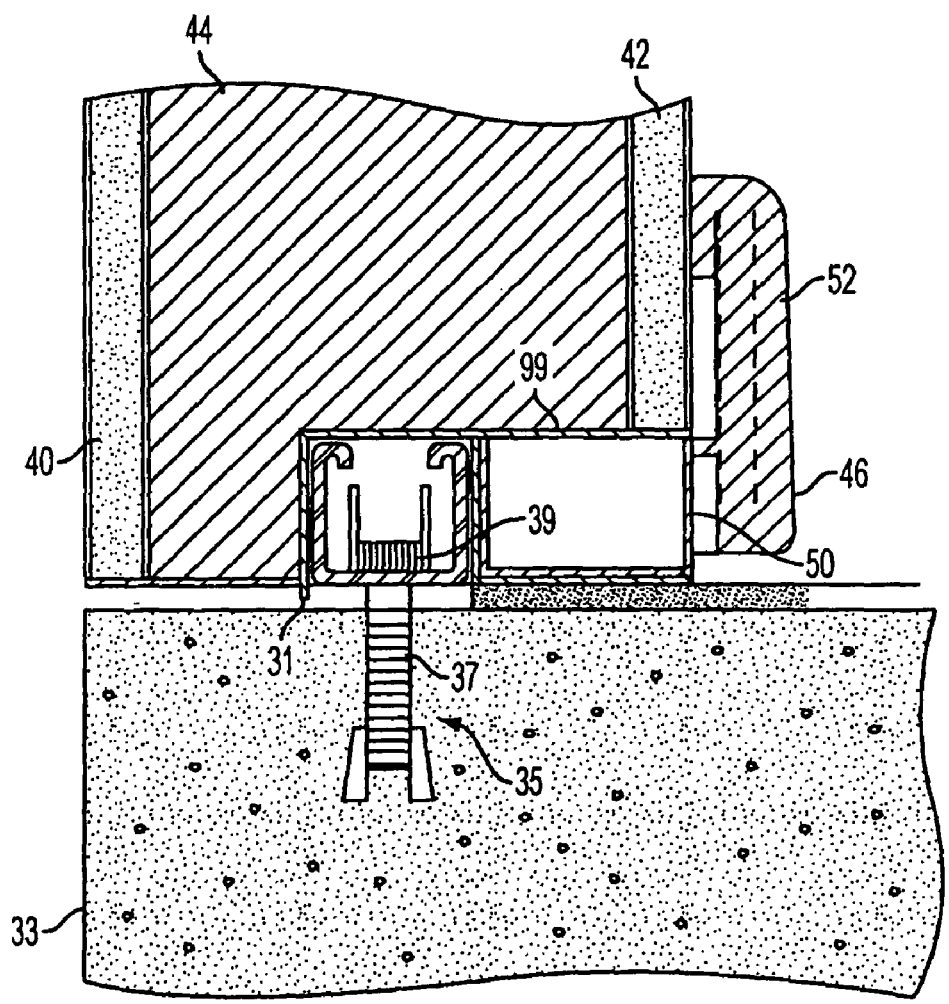
FIG. 4 is a vertical sectional view of a panel embodiment with a bottom conduit chase and an anchor that attaches a bottom elongate strut to a floor.

Now referring to FIG. 4, an anchoring system is depicted wherein a strut 31 is fastened to a concrete foundation 33 by anchor 35. An opening is made through the bottom surface of strut 31 that allows the shank section 37 to extend through while the head 39 engages the surface of the strut. As seen in the sectional view of the panel of FIG. 4, the exterior panel 40 and the interior panel 42 sandwich interior section 44 that is filled with adhesive foam. FIG. 4 also depicts a bottom chase section 46. Electrical wiring, antennae or telecommunications wiring may be installed in this chase. In a preferred embodiment, chase 46 has access holes provided along the length of the chase on the side 50 of the chase facing the interior of the structure. The chase is then covered by the installation of baseboard 52. A similar chase may be provided on the top section of the wall. The top chase may be covered by crown molding. It is contemplated that in some circumstances it will be desirable to include both chases in order to minimize interference.

Upon completion of the assembly, the exterior side of panel 40 is then provided with an additional finishing substrate such as conventional siding or stucco. In a preferred embodiment the exterior side of the panel is provided with a cement board or a commercially available "Hardy board" material. The manufacture of these cement board panels is known in the art. Walls for internal partitions may have opposite sides comprised of gypsum board. Because the panels used for interior panels do not require significant strength, an inexpensive filler material may be added to the core of the wall before polyurethane adhesive foam is introduced.

Figure 5:
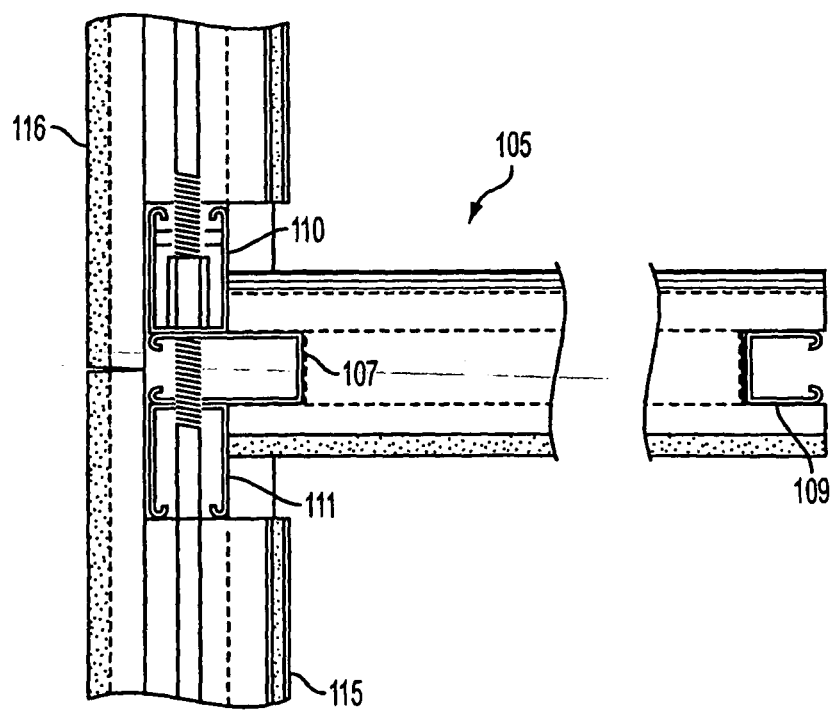
FIG. 5 is a vertical sectional view of a wall panel, a floor panel and a foundational member that depicts the connections between the elements.

Panels that are made in accordance with the invention may also be used as floor or ceiling elements. The steel frame is put in tension by the pressured polyurethane foam and when installed as a floor, the steel frame members act like integral floor joists. FIG. 5, depicts a sectional view of panel 105 employed as a floor element. In this application strut 107 and strut 109 are attached to the walls member so that a rectangular profile of the strut extends out from the wall section. A plurality of panels are then assembled along the struts 107 and 109. Tie rods running horizontally (not shown) may be placed between adjacent floor panels. As shown in FIG. 5, the struts 107, 110 and 111 have a dimension that allows them to be integrated with the modular system. Also the top frame member of wall 111 and the bottom of wall 116 are adapted so that they may accommodate support strut 107.

Figure 6:
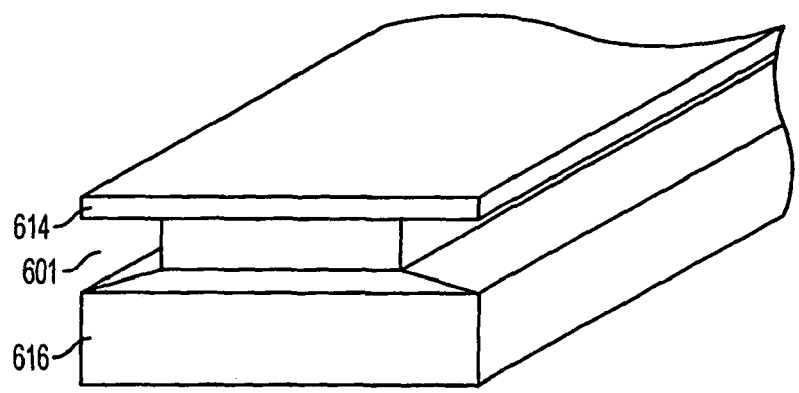
FIG. 6 is an isometric perspective schematic view of a panel embodiment wherein the channel is offset from the center of the panel.
Figure 7:
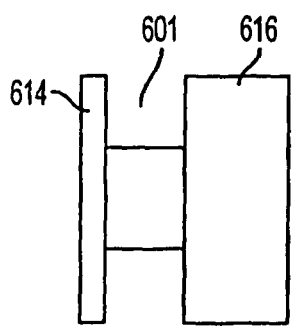
FIG. 7 is a side schematic view in elevation of a panel embodiment depicted in FIG. 6.
Figure 8:
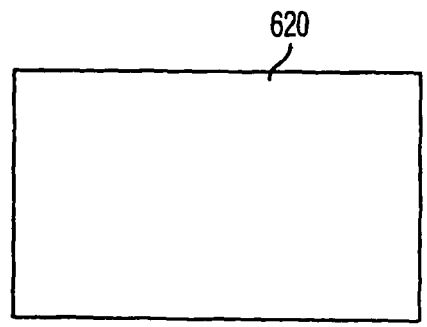
FIG. 8 is a side schematic view in elevation of the panel depicted in FIG. 6.

The panels may be made to a variety of dimensions. Now referring to FIG. 6, a perspective schematic drawing depicts a panel having an offset channel 601 wherein panel 614 has a larger width than panel 616. The side view of the panel, not drawn to accurate dimensions, further illustrates the manner in which the groove may be offset. This arrangement allows the frame to receive a thick planar sheet. In the preferred embodiments, the panel is 4½ inches, by 2 feet by 8 feet. However, other dimensions are contemplated depending on the application. For instance when cement based exterior walls are used, it is preferred to create 2 foot panels to allow ease of handing at the site. However, interior panels that comprise opposite gypsum boards may be made larger because they will not have such weight concerns.

Figure 9:
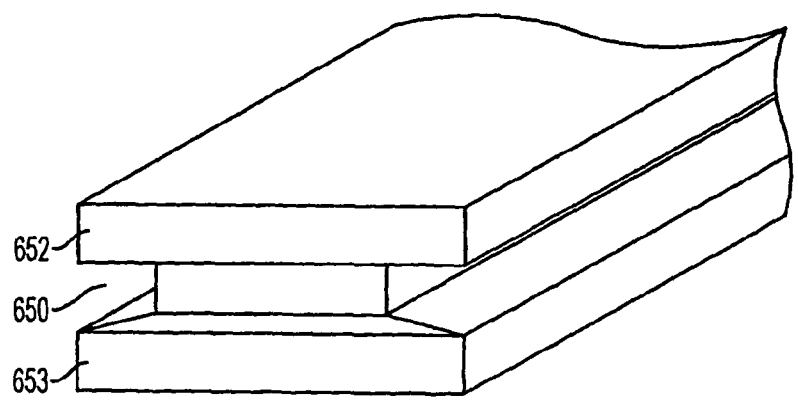
FIG. 9 is an isometric perspective schematic view of a panel embodiment wherein the channel is located in the center of the frame.
Figure 10:
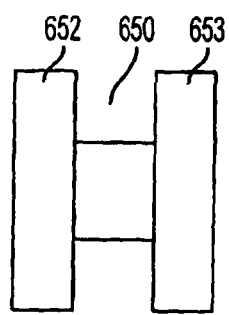
FIG. 10 is a side schematic view in elevation of a panel embodiment depicted in FIG. 9.
Figure 11:
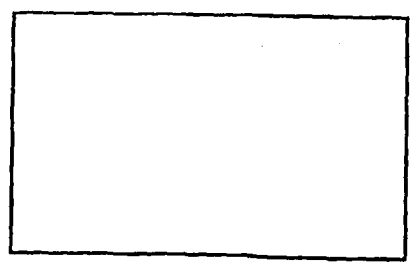
FIG. 11 is a side view in elevation of the panel depicted in FIG. 9.

FIGS. 9-11 depict a panel wherein a groove 650 is provided down the center of the frame members. In this embodiment, the abutting surfaces 652 and 653 are 1⅜ inch wide and the center channel is 1¾ inches.

Figure 12:
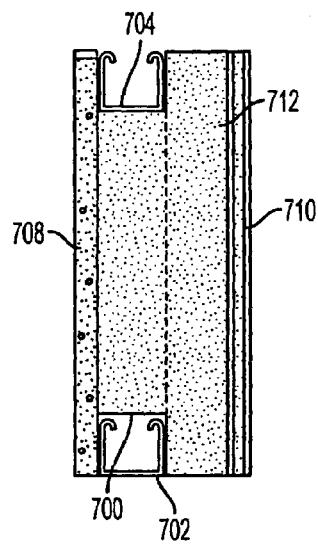
FIG. 12 is a side vertical sectional view of a panel in engagement with the top and bottom struts wherein the channel is offset from the frame and one panel is formed of cement.
Figure 13:
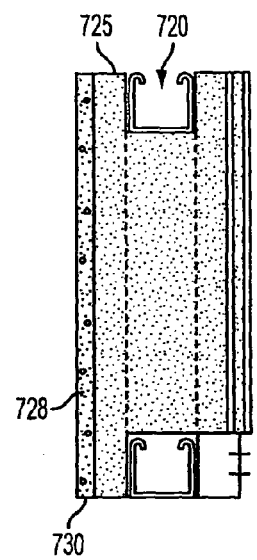
FIG. 13 is a side vertical sectional view of a panel in engagement with the top and bottom struts wherein the channel is formed in the center of the frame and further depicts a bottom chase.

FIG. 12 is a sectional view of a panel having an offset channel 700. Bottom U shaped strut 702 and top U shaped strut 704 are depicted in the top and bottom channels. The exterior sheet 708 is made of a cement board, the interior sheet 710 is gypsum board and the interior region 712 is filled with polyurethane foam. FIG. 13 depicts a side sectional view wherein the channel 720 is in the middle of the frame member 725. The bottom of this frame is an offset embodiment wherein the surface 730 of the frame that receives the exterior wall surface 728 and abuts the floor on the exterior side of the panel. On the opposite side of the channel, the bottom surface 99 of the channel 99 extends towards the interior wall surface. The side of the bottom channel is made from a tubular part 39 that is designed to receive electrical conduits.

Figure 14:
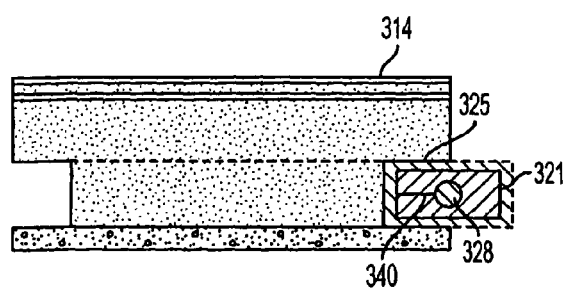
FIG. 14 is a horizontal sectional view of a panel that depicts tie rods on opposite sides within the lateral channels.

FIG. 14 depicts a top sectional view of a panel 314. In this view, a foam connector member 321 is shown within vertical channel 325. Panel 314 has an offset channel arrangement that continuously extends around the panel. Tie rod 328 is depicted within connector member 321. It is received in the center cavity region of the connector member through slit 340.

Figure 15:
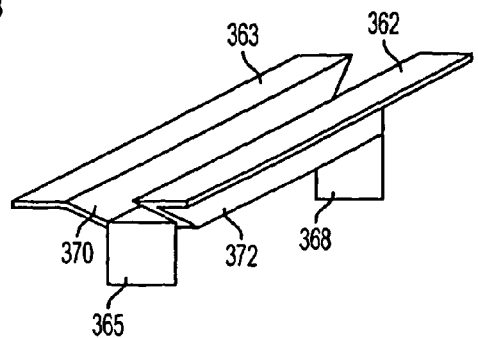
FIG. 15 depicts a perspective view of a frame element having a center channel.

FIG. 15 is a perspective view of one element 360 that makes up a frame member. Abutting surfaces 363 and 362 are positioned on opposite sides of the center channel. Tabs 365 and 368 are bent downward at an angle to position them parallel with the bottom of a channel on an adjacent frame member. Here, the angle of the side walls of channel 370 are cut on a 45 degree angle 371 so where it is positioned with an adjacent element it will form a 90 degree angle. In addition to assembly of the frame elements by attaching the tabs to the bottom of the channel, the parts may be welded along the seam where parts intersect.

Figure 31:
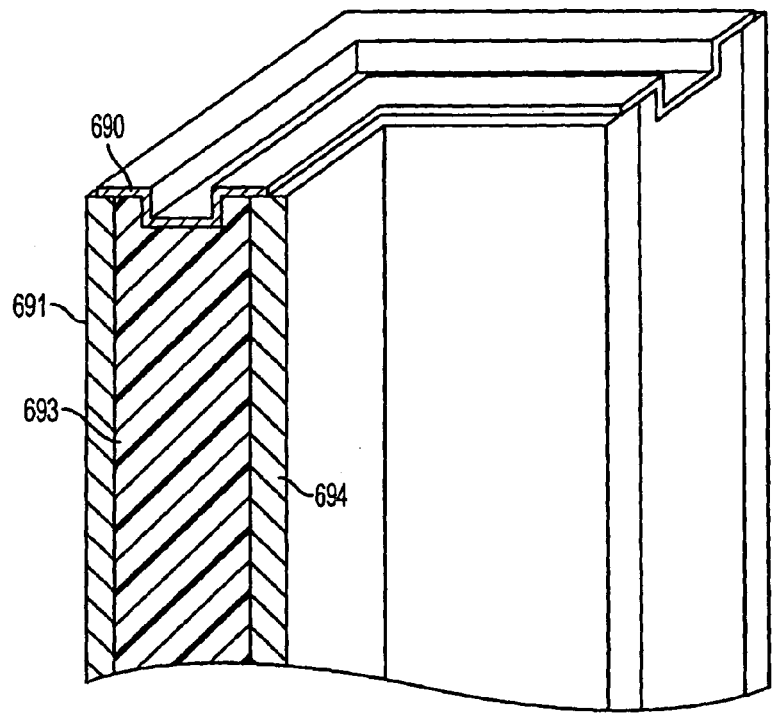
FIG. 31 is a perspective view in partial section of an embodiment of a corner panel according to the invention.
Figure 32:
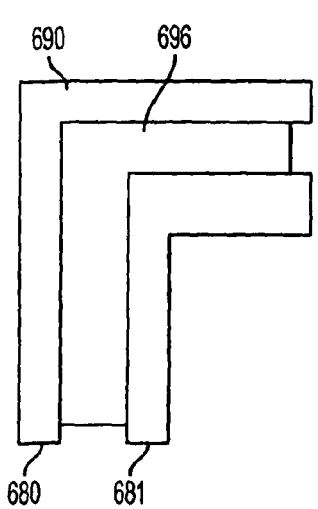
FIG. 32 is a top view of the corner panel depicted in FIG. 31.
Figure 33:
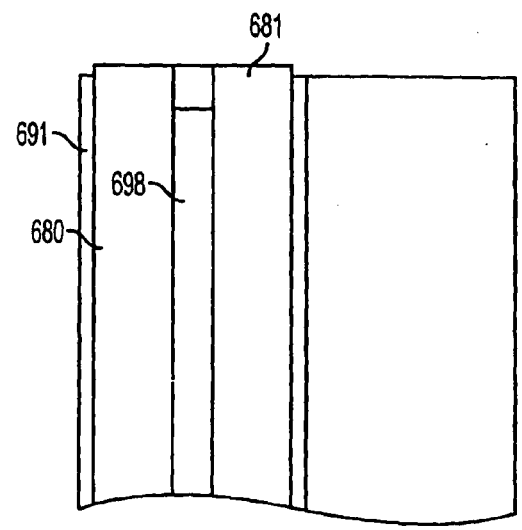
FIG. 33 is a side view in elevation of the corner panel depicted in FIG. 31.

FIG. 31 depicts a further feature of the invention wherein construction of preassembled corner panels is shown. These corner panels require the employment of an angled press designed to exert pressure on the exterior and interior portions of the panel. While a right angle is shown in FIGS. 31-36, it is contemplated that the corner may be formed in alternative angles. Yet as further alternative to a corner panel, a corner post may be provided that incorporates angled channels at the top and bottom surfaces and lateral sidewalls. The corner panel includes a top frame 690 having a channel 696, exterior sheet 691, interior sheet 694 and core 693. As shown in elevation at FIG. 33, the sides of the center corner panel that are intended to abut adjacent panels have a side channel 698, and opposite abutting surfaces 880 and 681.

Figure 34:
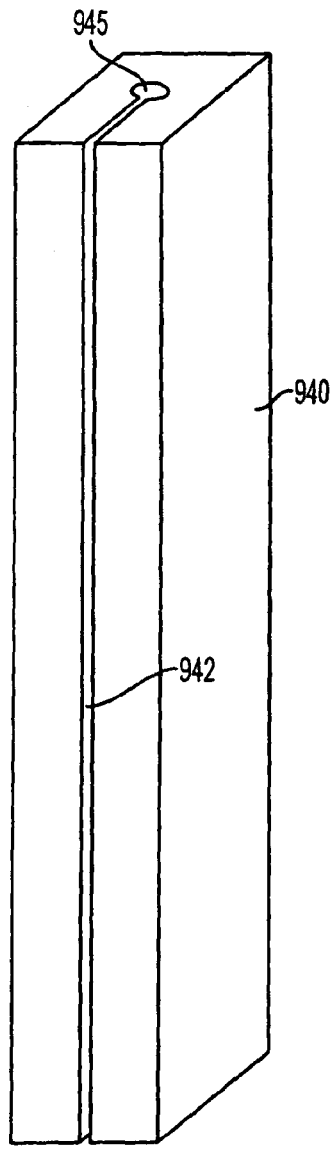
FIG. 34 is a perspective view of a foam connector element used in one embodiment of the invention.
Figure 35:
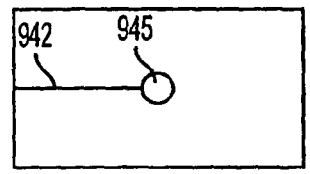
FIG. 35 is a top perspective view of the foam connector element depicted in FIG. 34.
Figure 37:
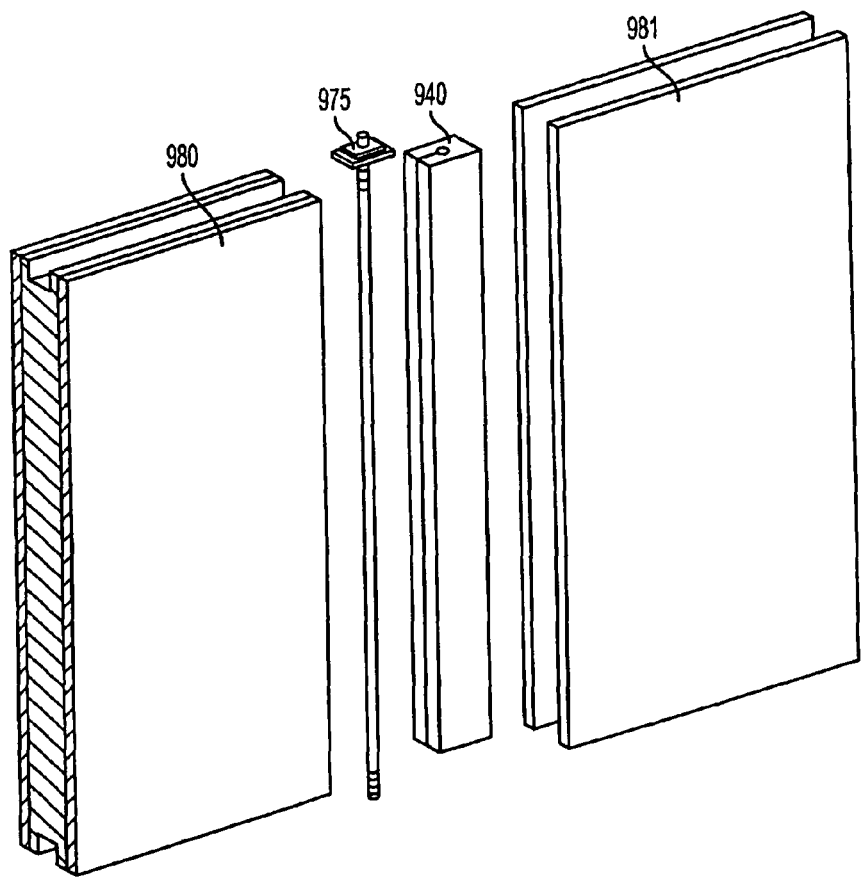
FIG. 37 is an exploded view showing the foam connector, two panels, and a connecting tie rod.

One of the improvements to this system is the incorporation of foam connector member 940. As seen in FIG. 34, the member 940 has a length approximately equal to the side channels of the panels. One surface of the member has an elongate split that will receive a tie rod. The tie rod is then seated in center cavity 945. The foam member can be compressed so that it will fit into the side channels and be retained. An alternative contemplated embodiment comprises a tubular foam member that receives a tie rod in the axial end. The foam member provides an air seal and insulates the channel region between adjacent panels. The arrangement of the connector member 940 is depicted in exploded view in FIG. 37 between wall panels 980 and 981. A connector member 321 is also depicted in FIG. 14 in place within panel side channel 325 showing tie rod 328 in the center cavity.

Figure 36:
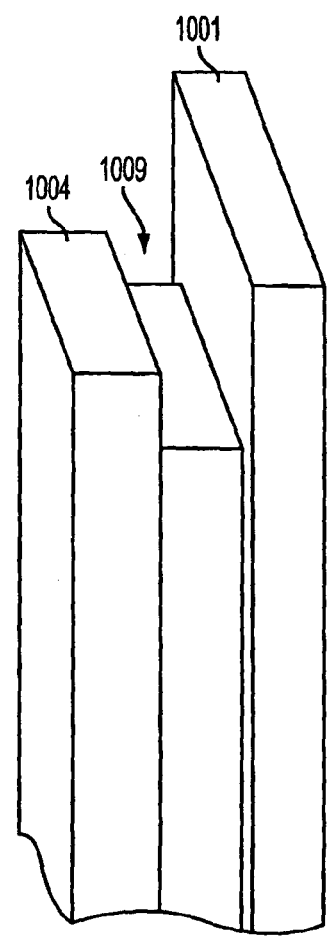
FIG. 36 is a perspective view of a further embodiment of the invention wherein the top frame element has a first abutting surface and a second offset surface.
Figure 38:
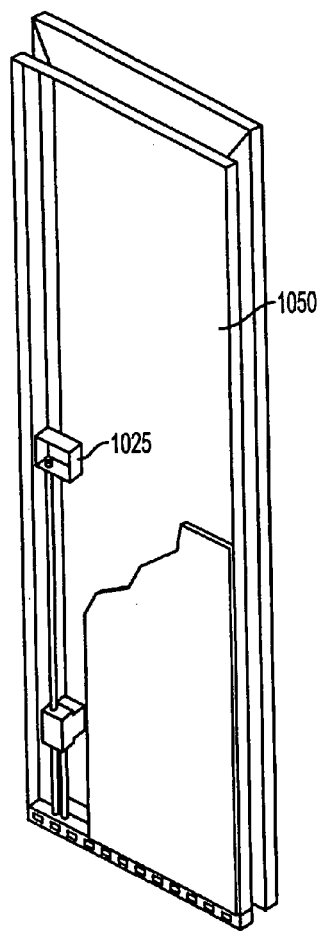
FIG. 38 is a perspective view of the embodiment of the invention depicted in FIG. 36 wherein the offset frame section is oriented on the bottom of the panel and a tubular channel is provided adjacent to the offset.
Figure 39:
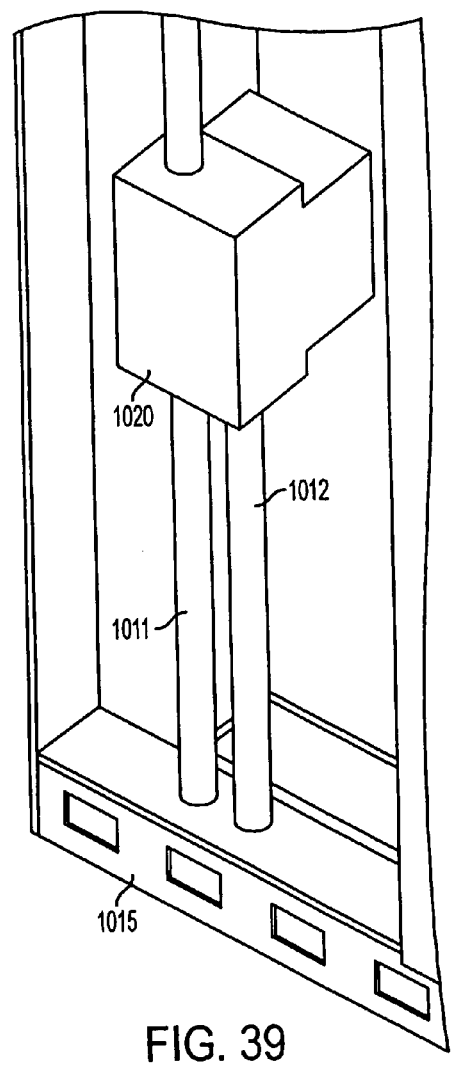
FIG. 39 is a magnified view of a portion of FIG. 38.
Figure 40:
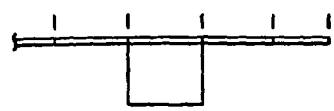
FIG. 40 is a side view in elevation of a further embodiment of a frame element.
Figure 41:
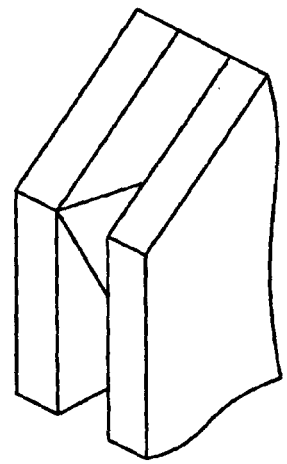
FIG. 41 depicts the joint between two frame members at an angle.
Figure 42:
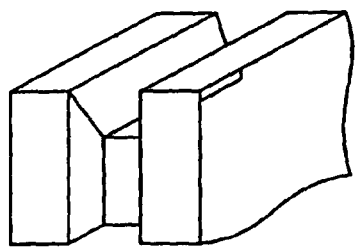
FIG. 42 depicts a joint between two frame members at a 90 degree angle.
Figure 43:
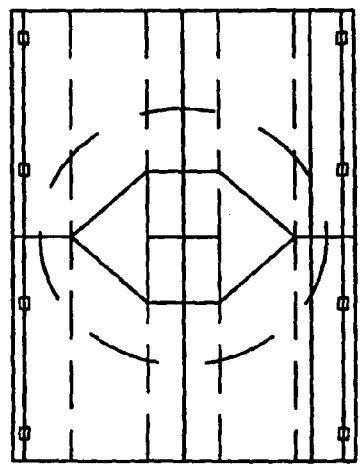
FIG. 43 depicts a top plan view of the sheet of metal that has been cut to be used as a frame element.

FIG. 36 depicts a panel embodiment wherein the top surface of the panel has an abutting surface 1001 and an offset surface 1004 on the opposite side of a channel 1009. As best seen in FIGS. 38 and 39, the panel 1050 of this embodiment is designed to receive a utility chase 1015. Also shown are conduits 1011 and 1012 to provide access to boxes 1020 and 1025. Conduits 1011, 1012 and boxes 1020 and 1025 are provided on the panel before the polyurethane foam is introduced and the components are securely held in place by the foam and by attachment to the planar sheets and frame elements.

A further feature of the invention allows frames to be assembled to form gables. This assembly technique first involves cutting the metal sheet and inner rail to a pre-selected pitch. As depicted in the accompanying FIGS. 40-43, the steel plate may be cut at a variety of preset angles so that panels may be formed in the shape of a trapezoid and used for gables.

To assemble the panels a frame is moved to a press where polyurethane foam is injected into a cavity defined by the opposite panels. The polyurethane both insulates and also structurally serves to bind the outer wall to the steel frame and inside panel. A laminate panel, or composite structural member, is fabricated by bonding a core material to two adjacent skins or face sheets using a bonding agent. Thus, the structural integrity of a laminate panel depends on factors that include the properties of the core material, the properties of the face sheet materials, the properties of the bonding agent, and the methods used to join these materials. The dimensions of the panel and of the individual elements also impact the structural integrity. The problem of ensuring structural integrity is further compounded by the need to economically provide these materials at the job site in fabricated form.

Figure 21:
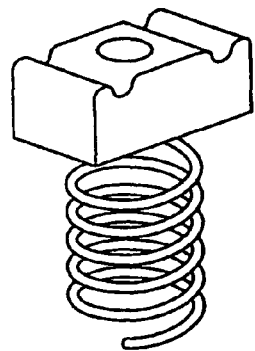
FIG. 21 is a connector element that is retained in a bottom strut and receives a tie rod.
Figure 22:
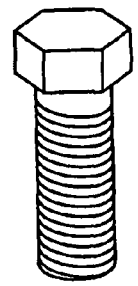
FIG. 22 is a schematic representation of a tie rod
Figure 23:
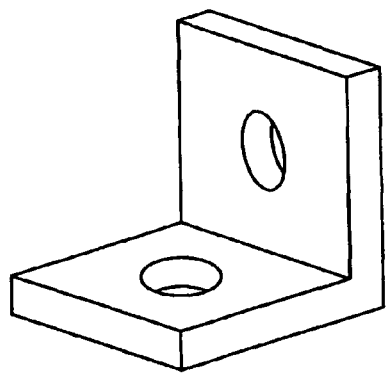
FIG. 23 is a perspective view of a bracket that may be attached to a strut to connect struts together.
Figure 24:
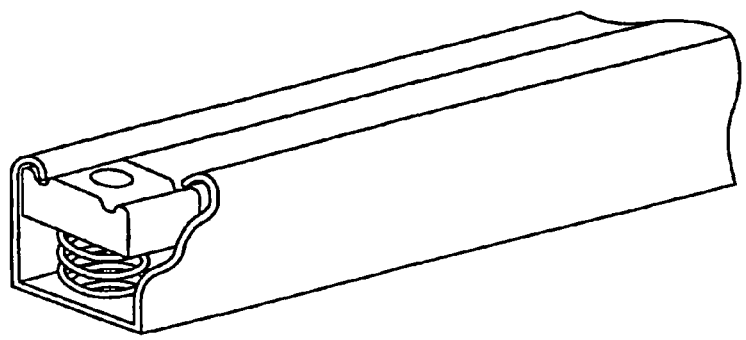
FIG. 24 is a perspective cutaway view of a strut and connector member.
Figure 25:
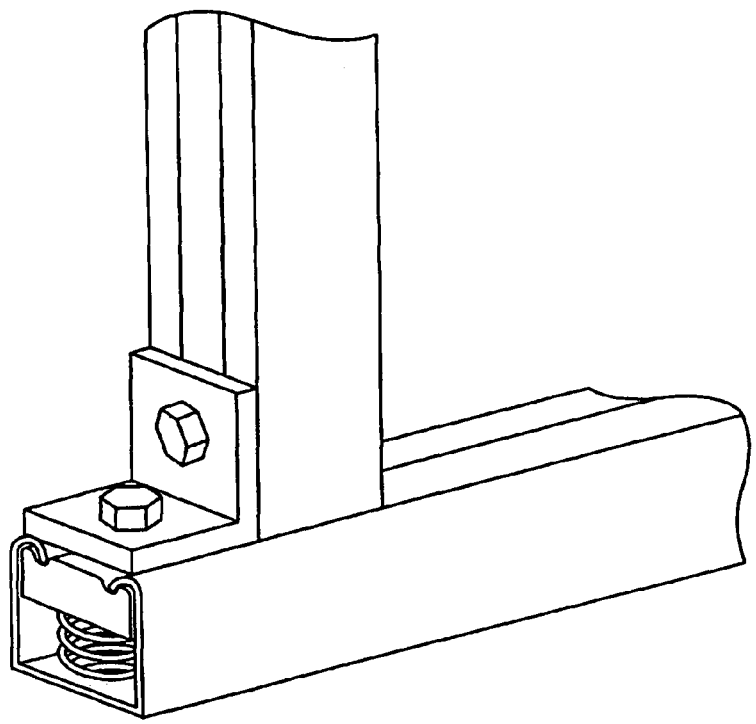
FIG. 25 is a perspective view of two struts attached to one another.

To assemble the panels into a structure, a suitable floor, slab or foundation is first provided. Foundations may comprise concrete block or a concrete slab or poured foundations. Walls may also be construed using other conventional floors set on foundations. Walls may also be constructed on top of walls made according to this invention or on conventional floor truss arrangements covered by plywood. It is also contemplated that the panels themselves may be employed as flooring rested atop a suitable support system such as that depicted in FIG. 5. Along the periphery of the foundation a "U-shaped" steel strut is attached to the floor or foundation. As shown in the accompanying FIGS. 24-25 these "U shaped" steel struts generally have a "U-shaped" profile with a top lip section that can be engaged by a channel nut 210. As shown in FIGS. 21 and 24, channel nut 210 includes coiled spring 211. When received within channel 240, the nut is biased toward the top of the channel. Grooves 215 and 216 engage the lip of the strut 240. In this arrangement, channel nut 210 may be slid along into strut 240 to a desired position. Channel nut 210 may receive a tie rod, such as member 26, 28 or 30 or a bracket 230. As best seen in FIG. 25. the attachment of a connector 220 to bracket 230 allows for the attachment of a strut at a 90 degree angle and thereby increases the versatility of arrangements that may be made. For instance, a plurality of panels may be connected together into a single unit. Since the panels are comprised of foam, the unit may be used as a floating dock.

Figure 26:
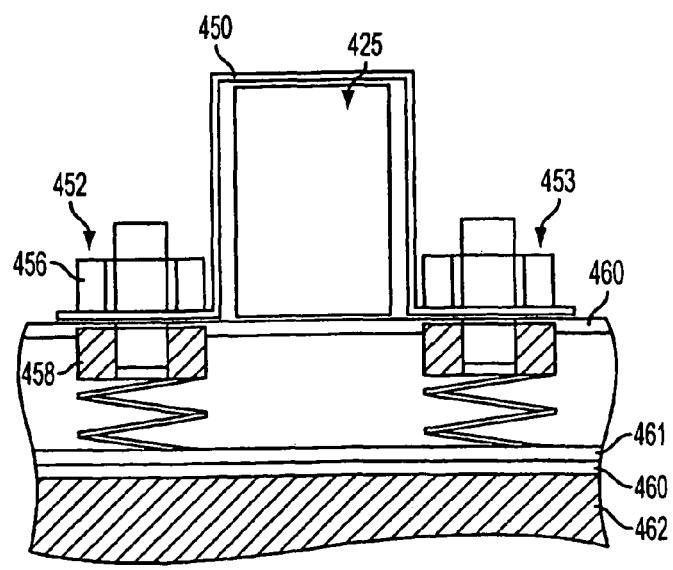
FIG. 26 is a side view of a wall panel showing a truss on top of a wall panel wherein the truss element is in section.

Now referring to FIG. 26, a bracket 450 is shown attached to connectors 452 and 453. The connectors comprise conventional bolts 556 that are attached to nuts 458 and retain the connector 450 on the top strut 460 that connects adjacent panels together. Shown in section, the bottom part 461 of strut 460 rests in the bottom of top channel. Below the channel floor of the top frame is polyurethane foam 462. This arrangement allows the securing of joist 425 to the top strut 460. In an alternative embodiment the bracket 450 may connect a roof truss. Using this hardware, conventional joist holders are not necessary.

Figure 28:
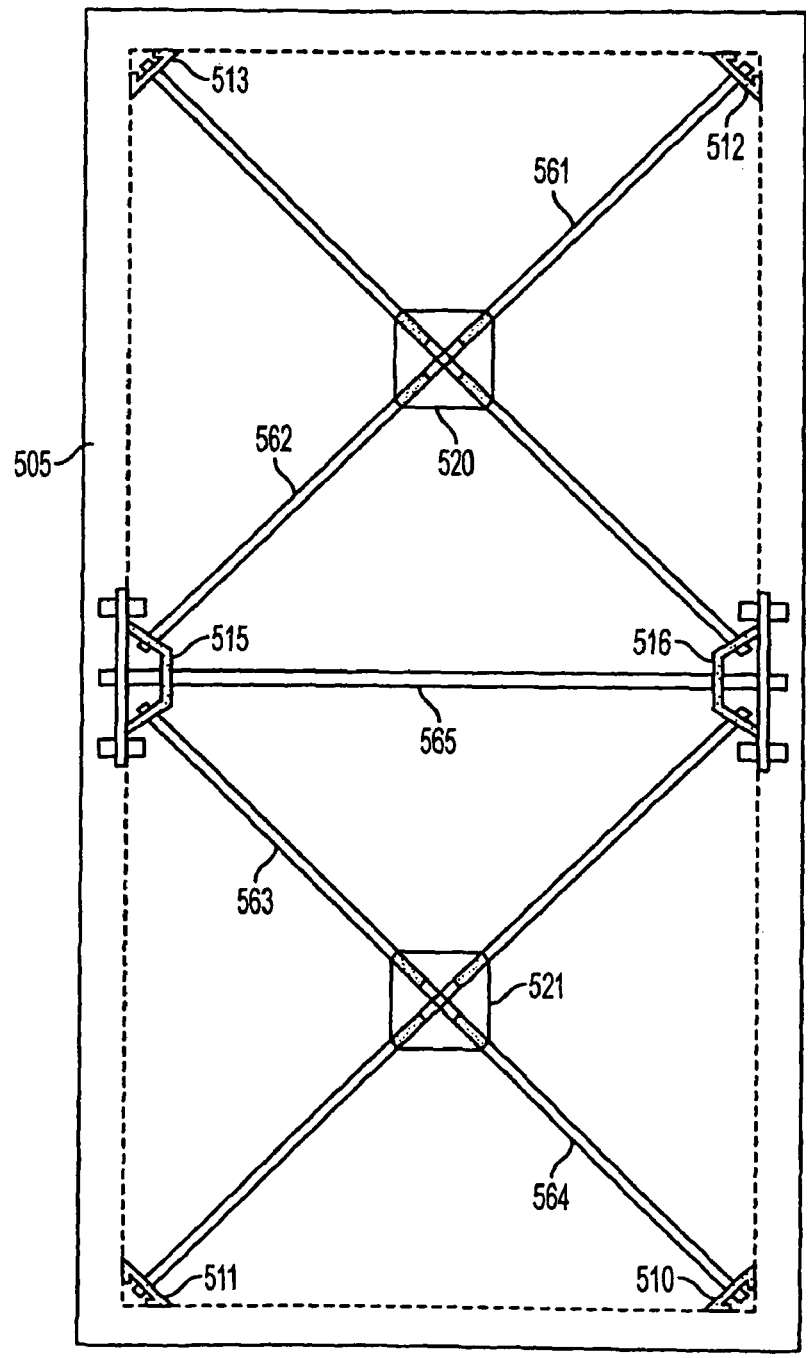
FIG. 28 is a side view in elevation of a sheer panel without the planar sheets in place.

FIG. 28 depicts a sheer panel. This panel may be incorporated into conventional stick frame housing when lateral support is required. The frame of the panel is made in the conventional manner and then corner brackets 511-514 are fastened to the interior corners of the frame 505. In this embodiment additional side brackets 515 and 516 are installed. Next threaded tie rods 561, 562, 563, 564 and 565 are attached to the opposite brackets as shown. Tie braces 521 and 522 can further be provided to secure the threaded tie rods. The panel is then assembled according to the panel assembly process described herein. Top and bottom panels are placed on opposite sides of the frame on a press and polyurethane foam is injected. This panel is extremely strong and can withstand significant sheer forces.

Figure 29:
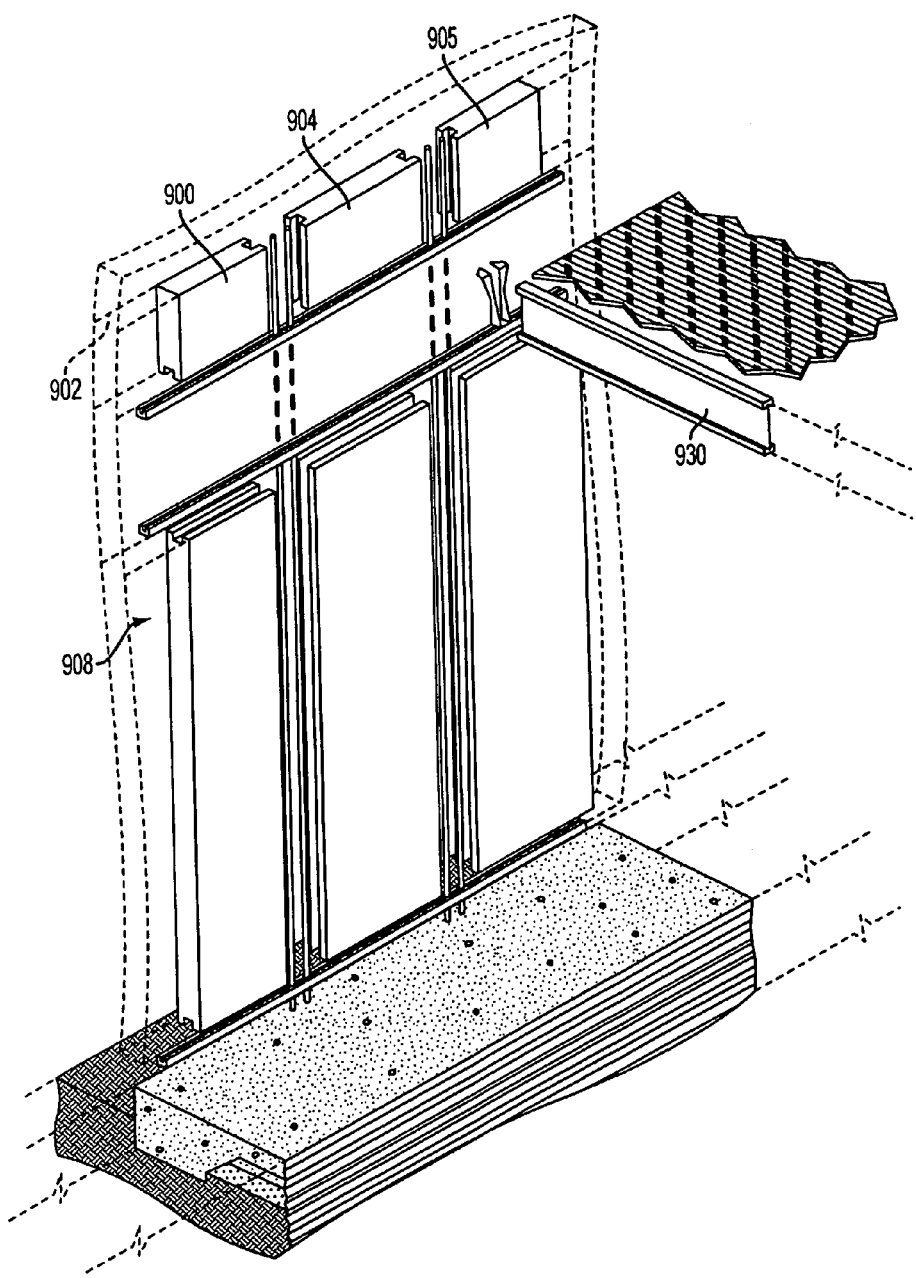
FIG. 29 is a perspective view of an alternative embodiment of the building system of the invention wherein a band wall or tension ring is attached on top of the side walls.
Figure 30:
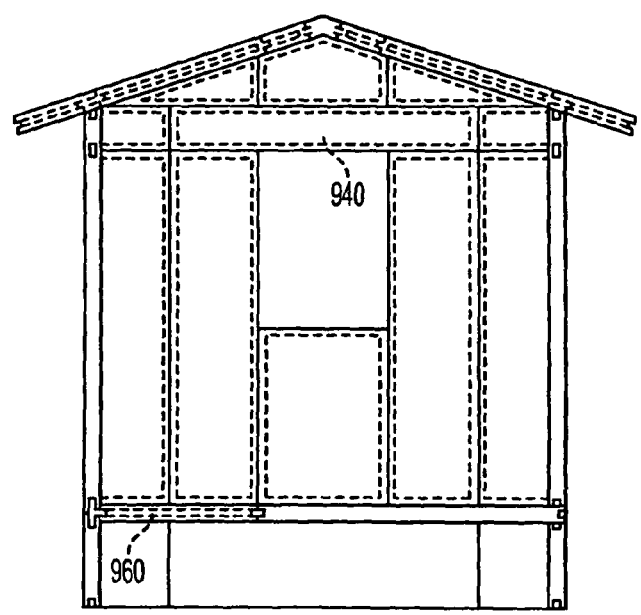
FIG. 30 is a side view of a structure wherein the band wall or tension ring that is shown in FIG. 29 is employed.

Now referring to FIG. 29, a top tension ring structure 900 is illustrated that is installed on top of a wall. This tension ring structure is made of a plurality of small panel sections 902, 904 and 905 and constructed like the wall 908. As shown in FIG. 30, long panels 940 may also be used. One advantage of such long panels is that they can serve as structural headers over windows or door openings. These panels are made in the same manner as the wall panels disclosed herein. The tension ring structure may be used to extend the height of the wall section so that the ceiling height is elevated. The torsion ring may be used a structure on which to hang joists 930. FIG. 30 also shows the panels used as structural floor elements 960.

According to a method of construction, after the bottom strut is in place a plurality of panels are positioned over the bottom strut. Next a U shaped strut is inserted into the top U shaped channel. Extended threaded rods are next inserted into the lateral space created by the opposite panels. A channel nut is inserted and, as it is turned, will lock into place in the bottom channel or U shaped rod. A series of the panels, which are generally in 2' by 8' sections are aligned adjacent to one another. After the parts are aligned the panels may be slid closely adjacent to one another. Upon completion of the structure, utilities such as electricity, telecommunications lines, water and sewage can be attached to the outside of the structure using protected cables or along the inside under the floor truss system. If the panel design has been selected that incorporates the chase elements, wiring may be then installed.

The foregoing invention is effective at resolving many of the difficulties of fabricating an integrated modular structure including rapid manufacture, low cost, relatively light weight, being integrated from environmentally sound materials, and being flexibly combined with other modular components to provide a modular building system.

Further, since the components are pre-manufactured the resulting structures can be manufactured with a consistent quality control with respect to the multiple components that make up the system. Likewise, governing agencies, responsible for issuing building codes, can therefore pre-approve entire structures and thereby reduce building costs and complexity. Recognized approval ratings can be established and maintained for a particular structure thereby reducing the need for inspecting the quality of installed structures.

One difficulty of building with conventional panels is to ensure the strength and structural integrity of each individual member or panel. A sandwich panel as disclosed herein may be considered as a beam or structural member with regard to its structural integrity. A beam must be capable of supporting various loads or forces between two or more given points of a building or structure. For example, the wall panels must support the second floor or roof trusses. A beam fails when it is does not have the required structural integrity or strength to safely support a given load condition. The structural integrity of the sandwich panel will be dependent on the choice of materials for use in the member and on the quality control with respect to the methods used to fabricate the materials into a finished structural member. From a structural integrity standpoint, the sandwich panels or structural members described are considered as beams. Their laminate construction including an inner and outer sheet provides for a strong structure and is able to withstand considerable sheer and stress forces. Further, the lateral frame elements can support considerable sheer forces. The quality or integrity of the bond between the core and facing sheet will affect the structural characteristics of the panel. Environmental conditions may also adversely affect the behavior of certain grades of exterior facings. In summary, the panel member has structural properties that vary greatly based on several factors. These factors include, but are not limited to: the properties of the face sheet or skin materials; the properties of the core material; the properties of the bonding agent used to join the core to the skins; the fabrication method or process used to effectuate the adhesive bond between the core and skins; and ambient conditions during fabrication. The materials and methods in connection with the finishing will also affect the following performance factors, including waterproofing; fire resistance; bug and vermin resistance; fungi-proofing; seismic stressing; sound absorption; insulation against heat or cold; design flexibility; and durability or product life.

We claim:

1. A modular construction system comprising a plurality of panels, said panels having peripheral frame elements, said frame elements attached to each other at their respective opposite ends, said frame elements making a frame, and said frame further defining a top channel, a bottom channel, and opposite side channels that face outwardly, and a first planar sheet element and a second planar sheet element, and an inner core section, said inner core section filled with an adhesive bonding material that attaches said sheet elements to said frame and to one another, and further comprising:
    an elongate bottom strut, said bottom strut having a length longer than the length of the bottom side of a panel, and said strut received in said bottom channel;
    an elongate top strut, said top strut received in said top channel and spanning said plurality of panels, and
    vertical tie means, said vertical tie means positioned between two adjacent panels to connect said top strut to said bottom strut and restrict the movement of said top strut and bottom strut away from one another, and
    said frame further comprising a metallic substrate and said frame having an outwardly facing surface, an inwardly facing surface and a thickness, said thickness surrounding at least one said planar sheet element and said thickness terminating on the edge of said panels before the peripheral edge of one of at least one of said planar sheet elements, and
    wherein the lateral sides of adjacent panels form a substantially planar surface.

2. The system recited in claim 1 wherein said vertical tie means comprise elongate threaded rods.

3. The system recited in claim 1 wherein said vertical tie means comprise wire in tension.

4. The system recited in claim 1 wherein an axial section of said top and bottom strut comprises a U-shaped profile.

5. The system recited in claim 1 wherein said second planar sheet is comprised of gypsum board.

6. The system recited in claim 1 wherein said first planar sheet is comprised of cement board.

7. The system recited in claim 1 wherein said bonding material comprises polyurethane foam.

8. The system recited in claim 1 wherein said bottom strut and said top strut are parallel with one another.

9. The system recited in claim 1 wherein said panels are polygonal.

10. The system recited in claim 1 wherein said bottom and said top struts are not parallel to one another.

11. The system recited in claim 10 wherein said panels are trapezoidal.

12. The system recited in claim 1 further comprising a hook and loop fastening system, wherein said hook and loop fastening system is attached to opposite lateral sides of the frame of abutting panels.

13. A method of making a wall comprising securing an elongate bottom strut on a base element, a plurality of panels having channels on a bottom surface on said elongate bottom strut, placing a top strut in a top channel provided in each said panel, positioning a tie rod between said bottom strut and said top strut in a passage formed between adjacent and abutting panel, engaging receiving and securing means in the bottom strut and securing the top of said tie rod thereby preventing said top strut from movement with respect to said bottom strut and wherein said panels comprise first planar sheet, a second planar sheet and a frame member around the periphery of said first and said second planar sheets, said frame member further comprising a thickness which surrounds said first and second planar sheets at the periphery and terminates before an outer peripheral edge of at least one said planar sheets, and adhesive displaced between said first and second planar sheets, and said frame member further comprising a channel which is adapted to receive said bottom and said top strut, wherein said panels comprise a laminate construction including a first planar sheet, a core region filled with an adhesive component, and a second planar sheet.

14. The method recited in claim 13 wherein said base element comprises a floor.

15. The method recited in claim 13 further comprising first setting a corner panel to said base element, wherein said corner panel extends in more than one plane.

* * * * *